United States Patent
Rao et al.

(10) Patent No.: US 11,812,154 B2
(45) Date of Patent: Nov. 7, 2023

(54) METHOD, APPARATUS AND SYSTEM FOR VIDEO PROCESSING

(71) Applicant: Realsee (Beijing) Technology Co., Ltd., Beijing (CN)

(72) Inventors: Tong Rao, Beijing (CN); Yi Zhu, Beijing (CN); Chengfeng Huang, Beijing (CN)

(73) Assignee: Realsee (Beijing) Technology Co., Ltd., Beijing (CN)

( * ) Notice: Subject to any disclaimer, the term of this patent is extended or adjusted under 35 U.S.C. 154(b) by 0 days.

(21) Appl. No.: 17/842,058

(22) Filed: Jun. 16, 2022

(65) Prior Publication Data
US 2023/0033267 A1    Feb. 2, 2023

(30) Foreign Application Priority Data
Jul. 30, 2021   (CN) .......................... 202110873542.X

(51) Int. Cl.
*G06T 7/33*     (2017.01)
*G06V 10/75*    (2022.01)
(Continued)

(52) U.S. Cl.
CPC ........... *H04N 23/698* (2023.01); *G06T 7/337* (2017.01); *G06V 10/751* (2022.01); *H04N 5/265* (2013.01);
(Continued)

(58) Field of Classification Search
CPC .... H04N 13/156; H04N 5/265; H04N 5/2622; G06T 2207/10016; G06T 2207/20221; G06V 10/751
See application file for complete search history.

(56) References Cited

U.S. PATENT DOCUMENTS 5,729,471 A * 3/1998 Jain ...................... H04N 5/2627
                                                  348/E13.058
5,850,352 A * 12/1998 Moezzi ................ H04N 13/246
                                                  348/E13.058
(Continued)

FOREIGN PATENT DOCUMENTS

CN      105844256 A      8/2016
CN      107509110 A     12/2017
(Continued)

OTHER PUBLICATIONS

Chinese Patent Office, First Office Action in Chinese Patent Application No. 202110873542.X (dated Jan. 25, 2022).
(Continued)

*Primary Examiner* — Brian P Yenke
(74) *Attorney, Agent, or Firm* — Leydig, Voit & Mayer, Ltd.

(57) ABSTRACT

A method for video processing is provided. The method comprises obtaining an image of a scene, obtaining a video that records an area included in the scene, determining one or more frames from the plurality of frames of the video, determining pairs of matched features, generating a plurality of composite frames by combining each of the selected one or more frames with the image of the scene based on the pairs of matched features, and generating a composite video based on the plurality of composite frames. Each of the pairs of matched features is related to an object that is in both the image and the one or more frames. Each of the pairs of matched features is associated with one or more pixels of the image of the scene and one or more pixels of a selected frame of the one or more frames.

20 Claims, 7 Drawing Sheets

(51) Int. Cl.
*H04N 5/262* (2006.01)
*H04N 5/265* (2006.01)
*H04N 13/156* (2018.01)
*H04N 23/698* (2023.01)

(52) U.S. Cl.
CPC ......... *H04N 5/2622* (2013.01); *H04N 13/156* (2018.05); *G06T 2207/10016* (2013.01); *G06T 2207/20221* (2013.01)

(56) References Cited

U.S. PATENT DOCUMENTS

| | | | | |
|---|---|---|---|---|
| 10,587,821 | B2* | 3/2020 | Elhage | G06T 7/33 |
| 10,999,530 | B1* | 5/2021 | Yildirim | G06T 5/007 |
| 11,146,727 | B2* | 10/2021 | Rao | G06T 15/503 |
| 11,270,448 | B2* | 3/2022 | Price | G06T 7/593 |
| 11,354,883 | B2* | 6/2022 | Zhang | G06V 10/44 |
| 11,356,619 | B2* | 6/2022 | Huang | G06F 18/253 |
| 11,461,975 | B2* | 10/2022 | Wang | H04N 13/183 |
| 11,533,431 | B2* | 12/2022 | Rao | G06T 15/503 |
| 11,538,177 | B2* | 12/2022 | Wu | G06T 7/33 |
| 11,620,730 | B2* | 4/2023 | Rao | G06T 7/13 382/100 |
| 2006/0120624 | A1* | 6/2006 | Jojic | G06F 16/739 382/284 |
| 2009/0021614 | A1* | 1/2009 | Baker | H04N 23/698 348/262 |
| 2012/0169842 | A1* | 7/2012 | Chuang | H04N 7/181 348/E7.001 |
| 2016/0086379 | A1* | 3/2016 | Sadi | G02B 27/0093 345/633 |
| 2016/0088287 | A1* | 3/2016 | Sadi | H04N 5/265 348/43 |
| 2016/0286138 | A1* | 9/2016 | Kim | G06F 18/22 |
| 2018/0139431 | A1* | 5/2018 | Simek | H04N 13/254 |
| 2020/0036952 | A1* | 1/2020 | Iwane | G06T 13/80 |
| 2021/0337136 | A1* | 10/2021 | Chang | G06T 11/60 |
| 2021/0400359 | A1* | 12/2021 | Ling | H04N 21/234336 |
| 2022/0394228 | A1* | 12/2022 | Dierks, III | H04N 13/156 |
| 2022/0405968 | A1* | 12/2022 | Rao | G06T 3/0068 |
| 2022/0415063 | A1* | 12/2022 | Bai | G06V 10/774 |
| 2023/0018557 | A1* | 1/2023 | Jiang | H04N 23/64 |
| 2023/0022444 | A1* | 1/2023 | Lee | G06T 3/4038 |
| 2023/0035477 | A1* | 2/2023 | Gu | G06T 7/55 |
| 2023/0063465 | A1* | 3/2023 | Bai | G06T 17/00 |
| 2023/0209205 | A1* | 6/2023 | Hu | G06T 3/4038 348/36 |

FOREIGN PATENT DOCUMENTS

| | | |
|---|---|---|
| CN | 110324718 A | 10/2019 |
| CN | 111866523 A | 10/2020 |
| CN | 112085659 A | 12/2020 |
| CN | 112562721 A | 3/2021 |
| CN | 113572978 A | 10/2021 |
| WO | 2020218024 A1 | 10/2020 |

OTHER PUBLICATIONS

Chinese Patent Office, Second Office Action in Chinese Patent Application No. 202110873542.X (dated Mar. 29, 2022).
Patent Cooperation Treaty, International Search Report, International Application No. PCT/CN2022/072978 (dated Apr. 21, 2022).
Chinese Patent Office, First Office Action in Chinese Patent Application No. 202110437420.6 (dated Oct. 19, 2021).
Chinese Patent Office, Second Office Action in Chinese Patent Application No. 202110437420.6 (dated Dec. 28, 2021).

* cited by examiner

METHOD, APPARATUS AND SYSTEM FOR VIDEO PROCESSING

CLAIM OF PRIORITY

This application claims the benefit of priority to Chinese Patent Application No. 202110873542.X, filed Jul. 30, 2021, the entire contents of which is incorporated herein by reference.

TECHNICAL FIELD

The present disclosure relates to the field of image processing technology and, more specifically, to image processing for generating virtual reality data.

BACKGROUND

Various technologies can be utilized to generate a panorama of a scene. For example, a three-dimensional (3D) scene may be simulated by virtual reality techniques via software, such that a virtual reality panorama may be generated. For another example, a panorama of a 3D scene may be generated based on a plurality of images of a scene acquired by a camera. The plurality of images may be stitched together so as to generate a 3D panoramic image of the scene.

When generating a panoramic video of a scene based on the current technology, a panoramic camera is needed to collect the data. A panoramic camera includes multiple lenses to take videos from different perspectives simultaneously. The videos are combined to generate a panoramic video of a scene. However, a panoramic camera is not a daily necessity like a mobile phone with imaging capacities, which therefore limits the applications of the panoramic video. In addition, the data collected by a panoramic camera for generating the panoramic video has a considerably large size due to the collection of multiple videos. When the collected data needs to be processed and/or stored on a different device, such as a server on the cloud, the quality of the network environment, such as the bandwidth for upload/download of data, becomes critical in influencing the user experience.

Thus, there is a need for providing technical solutions to generate a panoramic video of a scene with alleviated requirements for imaging devices and reduced amount of data for generating the panoramic video, so as to broaden the applications of the panoramic video and improve the user experience.

SUMMARY

A method, computer readable medium, system and apparatus are disclosed for generating a video.

In an exemplary embodiment, the present disclosure provides a method for video processing. The method for video processing comprises obtaining an image of a scene, obtaining a video that records an area included in the scene, determining one or more frames from the plurality of frames of the video, determining pairs of matched features, generating a plurality of composite frames by combining each of the selected one or more frames with the image of the scene based on the pairs of matched features, and generating a composite video based on the plurality of composite frames. The video comprises a plurality of frames. Each of the pairs of matched features is related to an object that is in both the image and the one or more frames. Each of the pairs of matched features is associated with one or more pixels of the image of the scene and one or more pixels of a selected frame of the one or more frames.

In a further exemplary embodiment, the image of the scene is associated with a first image plane, and each frame in the video is associated with a second image plane. The method further comprises determining one or more relationships between the first image plane and one or more second image planes based on the matched features. Generating the plurality of composite frames further comprises projecting pixels of the frames in the video from the associated second image planes to the first image plane based on the one or more relationships, and combining the projected pixels with the pixels of the image of the scene in the first image plane to generate the plurality of composite frames.

In a further exemplary embodiment, the area recorded by the video is a target scene included in the scene. Pixels in the composite frames that are related to the target scene are the projected pixels from the respective second image planes. The remainder pixels in the composite frames are from the pixels in the image of the scene.

In a further exemplary embodiment, the second image planes for the frames in the video are the same, and one relationship is determined between the first image plane and the second image planes based on the one or more frames.

In a further exemplary embodiment, the second image planes for the frames in the video include different second image planes. The frames in the video are divided into groups, and each group of the frames is associated with one second image plane. One relationship is determined for each group of the frames.

In a further exemplary embodiment, the method further comprises processing the plurality of composite frames to improve the quality of the composite frames. The composite video is generated based on the processed composite frames.

In a further exemplary embodiment, processing the plurality of composite frames further comprises mitigating boundaries caused by combining each of the one or more frames with the image of the scene, or adjusting colors in the composite frames.

In a further exemplary embodiment, determining the matched features between the image of the scene and the one or more frames further comprises determining a set of first features from the image of the scene, determining a set of second features from each of the one or more frames, and comparing the set of first features and each set of second features. The matched features include the first features and the corresponding second features that are related to the same objects in the scene based on the comparison results.

In a further exemplary embodiment, obtaining the image of the scene further comprises obtaining a plurality of images from different perspectives, and generating the image of the scene by combining the plurality of images.

In a further exemplary embodiment, the video is recorded by an imaging device, and the settings of the imaging device remain the same during the recording of the video.

In a further exemplary embodiment, the video is recorded for motions of one or more objects in the area included in the scene.

In a further exemplary embodiment, the method further comprises demonstrates causing display of the composite video.

In another exemplary embodiment, the present disclosure provides a device for video processing. The device comprises one or more processors, and a non-transitory computer-readable medium, having computer-executable instructions stored thereon. When executed by the one or more processors, the computer-executable instructions cause the one or more processors to facilitate obtaining an image of a scene, obtaining a video that records an area included in the scene, determining one or more frames from the plurality of frames of the video, determining pairs of matched features, generating a plurality of composite frames by combining each of the selected one or more frames with the image of the scene based on the pairs of matched features, and generating a composite video based on the plurality of composite frames. The video comprises a plurality of frames. Each of the pairs of matched features is related to an object that is in both the image and the one or more frames. Each of the pairs of matched features is associated with one or more pixels of the image of the scene and one or more pixels of a selected frame of the one or more frames.

In a further exemplary embodiment, the image of the scene is associated with a first image plane, and each frame in the video is associated with a second image plane. When executed by the one or more processors, the computer-executable instructions cause the one or more processors to further facilitate determining one or more relationships between the first image plane and one or more second image planes based on the matched features. Generating the plurality of composite frames further comprises projecting pixels of the frames in the video from the associated second image planes to the first image plane based on the one or more relationships, and combining the projected pixels with the pixels of the image of the scene in the first image plane to generate the plurality of composite frames.

In a further exemplary embodiment, the area recorded by the video is a target scene included in the scene. Pixels in the composite frames that are related to the target scene are the projected pixels from the respective second image planes. The remainder pixels in the composite frames are from the pixels in the image of the scene.

In a further exemplary embodiment, the second image planes for the frames in the video are the same, and one relationship is determined between the first image plane and the second image planes based on the one or more frames.

In a further exemplary embodiment, the second image planes for the frames in the video include different second image planes. The frames in the video are divided into groups, and each group of the frames is associated with one second image plane. One relationship is determined for each group of the frames.

In a further exemplary embodiment, when executed by the one or more processors, the computer-executable instructions cause the one or more processors to further facilitate processing the plurality of composite frames to improve the quality of the composite frames. The composite video is generated based on the processed composite frames.

In a further exemplary embodiment, processing the plurality of composite frames further comprises mitigating boundaries caused by combining each of the one or more frames with the image of the scene, or adjusting colors in the composite frames.

In yet another exemplary embodiment, the present disclosure provides a non-transitory computer-readable medium having processor-executable instructions stored thereon for video processing. When executed by the one or more processors, the computer-executable instructions cause the one or more processors to facilitate obtaining an image of a scene, obtaining a video that records an area included in the scene, determining one or more frames from the plurality of frames of the video, determining pairs of matched features, generating a plurality of composite frames by combining each of the selected one or more frames with the image of the scene based on the pairs of matched features, and generating a composite video based on the plurality of composite frames. The video comprises a plurality of frames. Each of the pairs of matched features is related to an object that is in both the image and the one or more frames. Each of the pairs of matched features is associated with one or more pixels of the image of the scene and one or more pixels of a selected frame of the one or more frames.

BRIEF DESCRIPTION OF THE DRAWINGS

The subject technology will be described in even greater detail below based on the exemplary figures, but is not limited to the samples. All features described and/or illustrated herein can be used alone or combined in different combinations. The features and advantages of various examples will become apparent by reading the following detailed description with reference to the attached drawings which illustrate the following.

DETAILED DESCRIPTION

Various examples of the present disclosure provide methods for generating a composite video (e.g., a panoramic video) based on an image of a scene (e.g., a panoramic image of the scene) and a video recorded for an area included in the scene. The video records motions of one or more objects in the area, which is defined as a target area. There are no motions beyond the target area in the scene, thus, the respective pixels included in the image of the scene may be utilized for generating the composite video rather than recording the entire scene. Recording the entire scene normally requires a specific imaging device (e.g., a panoramic camera) with multiple lenses to record multiple videos simultaneously. Then, the multiple videos are combined to generate a video for the entire scene. On the contrary, the present disclosure utilizes pixels of the image of the scene for generation of the video of the scene, such that less amount of data (including an image of a scene and a video recorded for a target area in the scene) is needed for generating a video of an entire scene (e.g., a panoramic video), thus greatly reducing the dependency of the device performance on the quality (e.g., bandwidth) of the network environment when the data is transferred over the cloud for computing and/or presentation. In addition, by applying the techniques disclosed herein, specific imaging devices, such as panoramic cameras, are no longer required for collecting data. Imaging devices, such as mobile phones having imaging modules integrated therein, may be utilized to collect data for generating a panoramic video, thus enabling more applications for a panoramic video.

By applying the techniques provided herein, a high-quality panoramic video of a scene may be generated, thus providing improved user experience for various applications, such as simulated VR applications.

Figure 1:
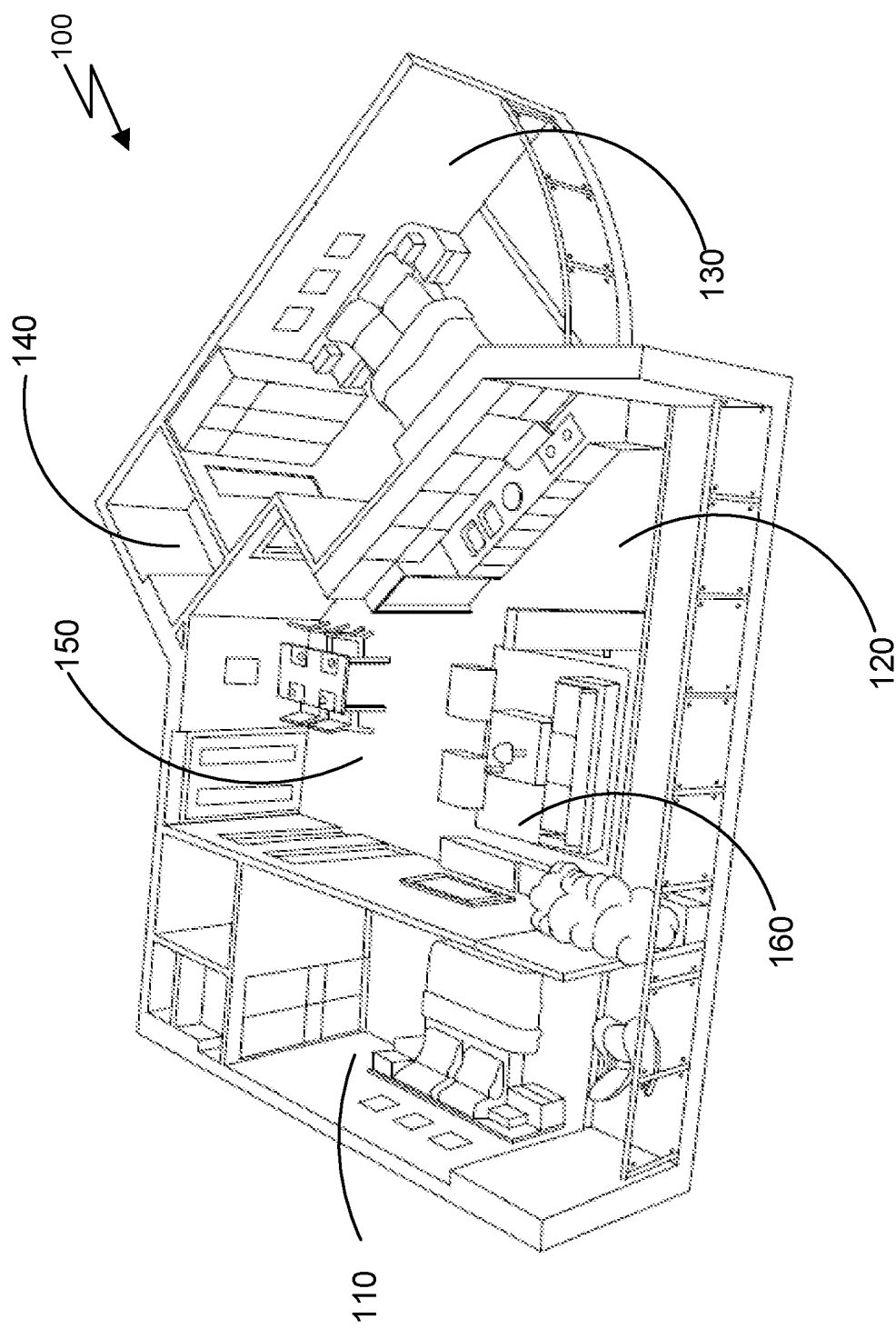
FIG. 1 illustrates an exemplary 3D virtual reality (VR) environment in accordance with one or more examples.

FIG. 1 illustrates an exemplary 3D VR environment 100, in accordance with some embodiments. As shown in FIG. 1, 3D VR environment 100 may simulate or represent a residential unit, such as an apartment or house floor. It is noted that 3D VR environment 100 may include a VR representation of any in-door space or environment. Referring to FIG. 1, 3D VR environment 100 may include one or more functional spaces, such as 110, 120, 130, 140, 150, and 160. As used herein, a functional space refers to an enclosed or partially enclosed space that is associated with a particular function. In some cases, a functional space may correspond to a room. For example, functional space 110 may correspond to a first bedroom, and functional space 130 may correspond to a second bedroom. In some instances, a functional space may correspond to an enclosed or partially enclosed space within or adjacent to a room. For example, functional space 140 may correspond to a closet. In other instances, a function space may correspond to an area that is generally used for a specific purpose. For example, functional space 120 may correspond to a kitchen area, functional space 150 may correspond to a dining area, and functional space 160 may correspond to a living room. Although functional spaces 120, 150, and 160 may share the same room (e.g., an enclosed area), they may be considered as different functional spaces due to their different functions.

Figure 2:
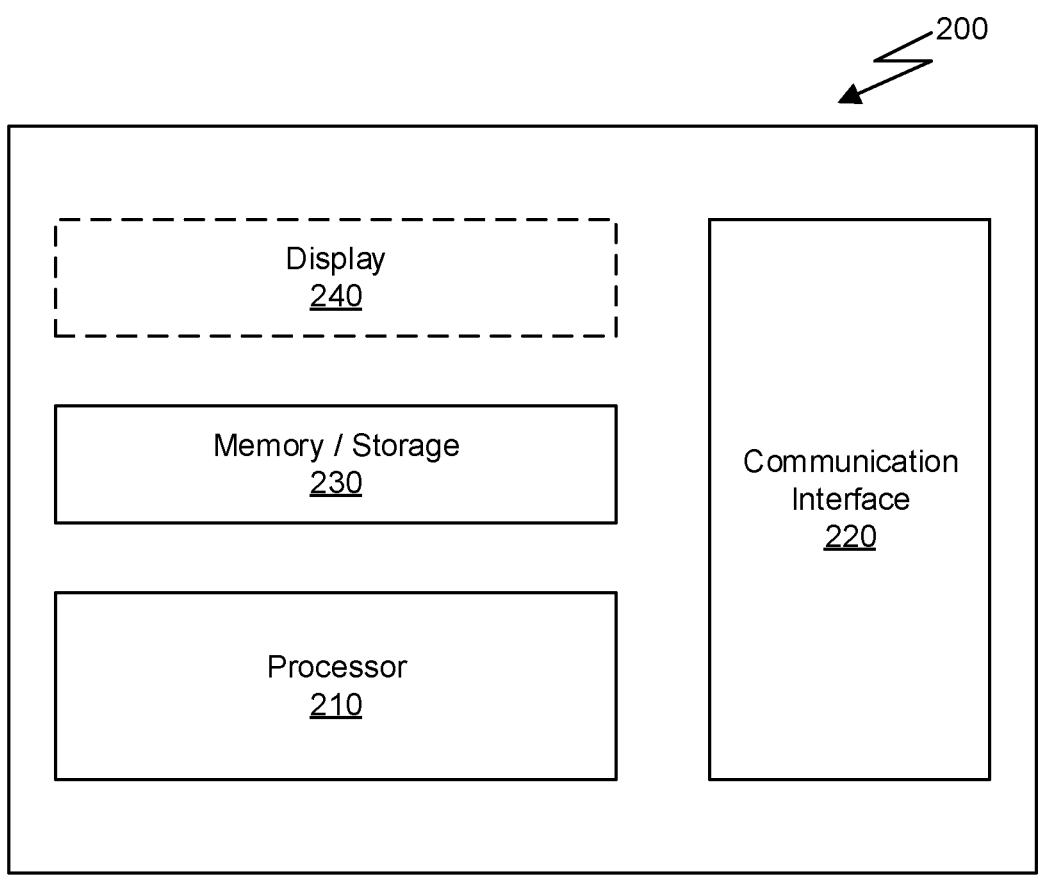
FIG. 2 illustrates a block diagram of an exemplary computer system in accordance with one or more examples.

FIG. 2 illustrates a block diagram of an exemplary computer system 200 configured to implement various functions disclosed herein. For example, the computer system 200 may be configured as a server to create or reconstruct VR environment 100. In another example, computer system 200 may be configured as a terminal device to display or enrich VR environment 100. As shown in FIG. 2, computer system 200 may include a processor 210, a communication interface 220, a memory/storage 230, and a display 240. Memory/storage 230 may be configured to store computer-readable instructions that, when executed by processor 210, can cause processor 210 to perform various operations disclosed herein. Memory 230 may be any non-transitory type of mass storage, such as volatile or non-volatile, magnetic, semiconductor-based, tape-based, optical, removable, non-removable, or other type of storage device or tangible computer-readable medium including, but not limited to, a read-only memory (ROM), a flash memory, a dynamic random-access memory (RAM), and/or a static RAM.

Processor 210 may be configured to perform the operations in accordance with the instructions stored in memory 230. Processor 210 may include any appropriate type of general-purpose or special-purpose microprocessor, digital signal processor, microcontroller, or the like. In some examples, processor 210 may be configured as a separate processor module dedicated to performing one or more specific operations disclosed herein. In other examples, processor 210 may be configured as a shared processor module for capable of performing other operations unrelated to the one or more specific operations disclosed herein.

Communication interface 220 may be configured to communicate information between computer system 200 and other devices or systems. For example, communication interface 220 may include an integrated services digital network (ISDN) card, a cable modem, a satellite modem, or a modem to provide a data communication connection. As another example, communication interface 220 may include a local area network (LAN) card to provide a data communication connection to a compatible LAN. As a further example, communication interface 220 may include a high-speed network adapter such as a fiber optic network adaptor, 10 G Ethernet adaptor, or the like. Wireless links can also be implemented by communication interface 220. In such an implementation, communication interface 220 can send and receive electrical, electromagnetic or optical signals that carry digital data streams representing various types of information via a network. The network can typically include a cellular communication network, a Wireless Local Area Network (WLAN), a Wide Area Network (WAN), or the like.

Communication interface 220 may also include various I/O devices such as a keyboard, a mouse, a touchpad, a touch screen, a microphone, a camera, a biosensor, etc. A user may input data to a terminal device through communication interface 220.

Display 240 may be integrated as part of computer system 200 or may be provided as a separate device communicatively coupled to computer system 200. Display 240 may include a display device such as a Liquid Crystal Display (LCD), a Light Emitting Diode Display (LED), a plasma display, or any other type of display, and provide a Graphical User Interface (GUI) presented on the display for user input and data depiction. In some embodiments, display device 240 may include a VR goggle, a pair of VR glasses, or other similar devices that provide immersive VR experience. For example, VR environment 100 may be displayed on display 240. In some embodiments, display 240 may be integrated as part of communication interface 220.

Figure 3:
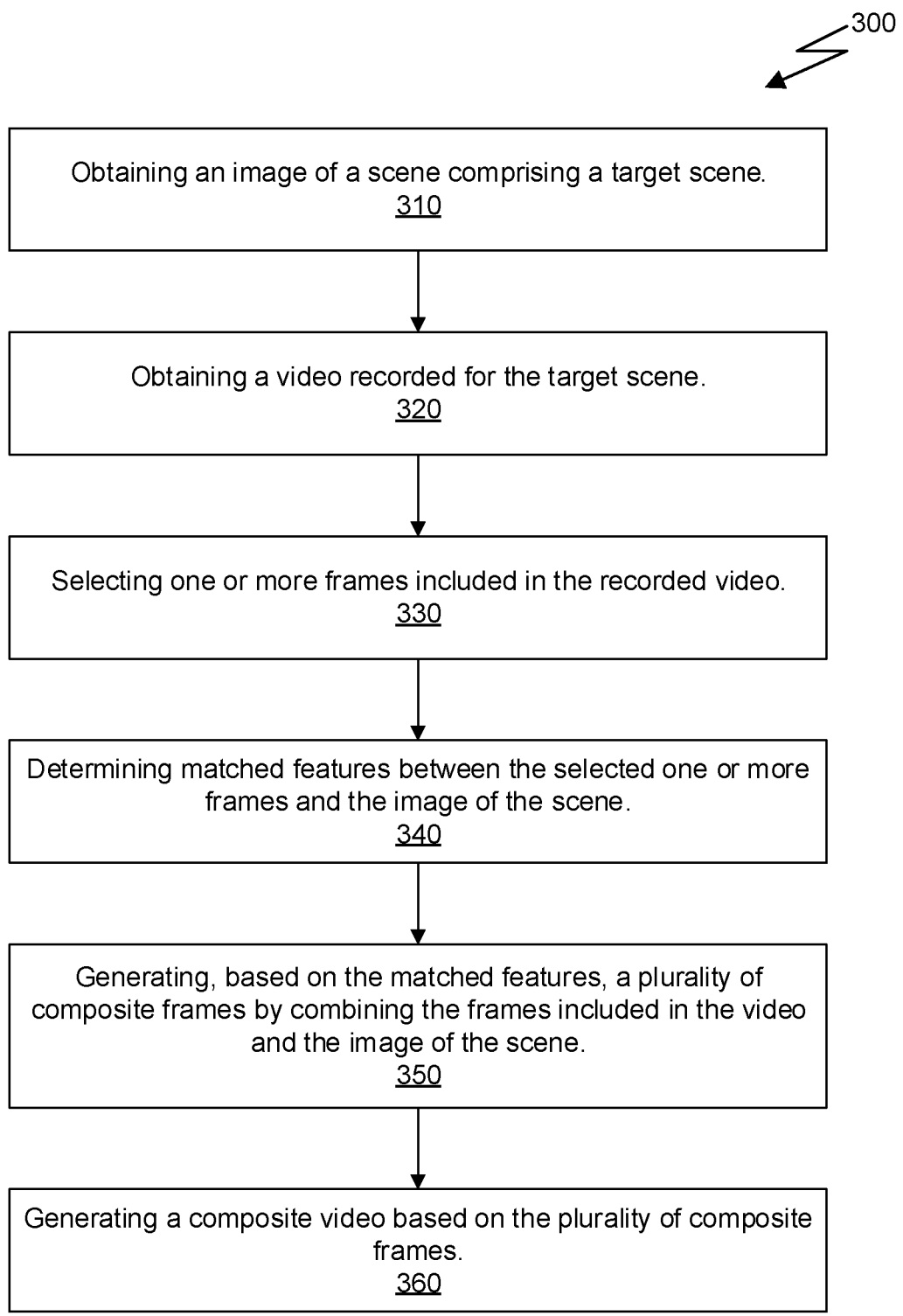
FIG. 3 is an exemplary process for generating a composite video in accordance with one or more examples.

FIG. 3 is an exemplary process 300 for generating a composite video according to one or more examples in the present disclosure. The process 300 may be performed by the processor 210 included in the computer system 200 according to the computer-executable instructions stored in the memory 230 as shown in FIG. 2. The computer system 200 may obtain images and/or videos from an imaging device that is attached to the computer system 200 via the communication interface 220. Additionally, and/or alternatively, the computer system 200 may process images and/or videos acquired by an imaging sensor/module that is integrated in the computer system 200. For example, the computer system 200 may be a mobile phone having one or more camera modules integrated therein. In some examples, the computer system 200 may further include one or more platforms (e.g., a tripod head), motors, and/or actuators to position and/or re-position the imaging sensor/module for acquiring a number of images of a scene from different perspectives. Alternatively, the computer system 200 may send signals via the communication interface 220 to drive one or more platforms (e.g., a tripod head), motors, and/or actuators that are attached to an external imaging device, such that the computer system 200 may manipulate orientation of the external imaging device for acquiring a number of images of a scene. The scene may be confined space, such as a room in a residential unit, or open space, such as a stadium or a natural scenery. Thereafter, the computer system 200 may obtain the acquired images of the scene via the communication interface 220 from the external imaging device. The computer system 200 may generate a composite image based on the number of images acquired for the scene from different perspectives. For instance, the composite image may be a panoramic image of the scene, which has a field of view approximating, or greater than, that of the human eye (e.g., 160° horizontally and 75° vertically). Additionally, and/or alternatively, the computer system 200 may control the integrated imaging sensor/module or the external imaging device to acquire a video for an area included in the scene. The area may be defined as a target area. In some instances, the computer system 200 may not have control over the positioning of the imaging device for acquiring images and/or videos and may solely perform the processing of the received images and/or videos from the imaging device. It will be recognized that process 300 may be performed in any suitable environment and in any suitable order.

At block 310, the computer system 200 obtains an image of a scene comprising a target scene. The image of the scene may be a composite image that is generated based on a plurality of images acquired for the scene. For example, an imaging device, such as a mobile phone having an imaging module integrated therein, is disposed on a tripod, and used to acquire a plurality of images of a scene. The tripod is controlled to pan/tilt the imaging device disposed thereon, such that the imaging device acquires the plurality of images of the scene from different perspectives. In some instances, the computer system 200, such as the mobile phone or a server wirelessly connected to the mobile phone, combines the plurality of images by applying feature detection algorithms and/or based on parameters related to the imaging device. The parameters related to the imaging device include the focal length, the image center, the pose (e.g., the rotation and translation), and other parameters of the imaging device. As such, the computer system 200 obtains a composite image of the scene that has an enlarged field of view than a single image that is acquired by the imaging device. In some variations, the computer system 200 obtains the composite image of the scene from another device that processes the combination of the plurality of images and generates the composite image. Other imaging devices, such as panoramic cameras, may be utilized to obtain the image of the scene.

A target scene is a portion of the scene that is represented as an area included in the composite image of the scene. A video is recorded for the target scene. The area associated with the target scene may be related to the field of view of the imaging device that records the video.

At block 320, the computer system 200 obtains a video recorded for the target scene. In some examples, the imaging device is disposed at a fixed position with a fixed shooting pose while recording the video. Thus, shooting parameters related to pan/tilt of the imaging device remain the same during the video recording. Additionally, and/or alternatively, internal parameters, such as the focal length, resolution, shooting rate and other shooting parameters, may also remain the same during the video recording. To this end, the target scene is related to the same area in the image of the scene. In some instances, the shooting parameters of the imaging device (e.g., the pan/tilt/zoom of the imaging device) may vary during the video recording, thus, the corresponding target scene may be related to different areas included in the image of the scene. The video may be recorded before or after generation of the image of the scene.

The area of the target scene in the image of the scene may be determined by transforming the image plane associated with each of the frames included in the video to the image plane associated with the image of the scene. The transformation relates the pixels of the frames to the pixels included in the image of the scene based on alignment of the same objects included in both the frames and the image of the scene. In other words, for each frame included in the video, each of the pixels included in the frame is mapped to a spot included in the image of the scene according to the transformation, where the spot includes one or more pixels in the image of the scene.

Figure 4:
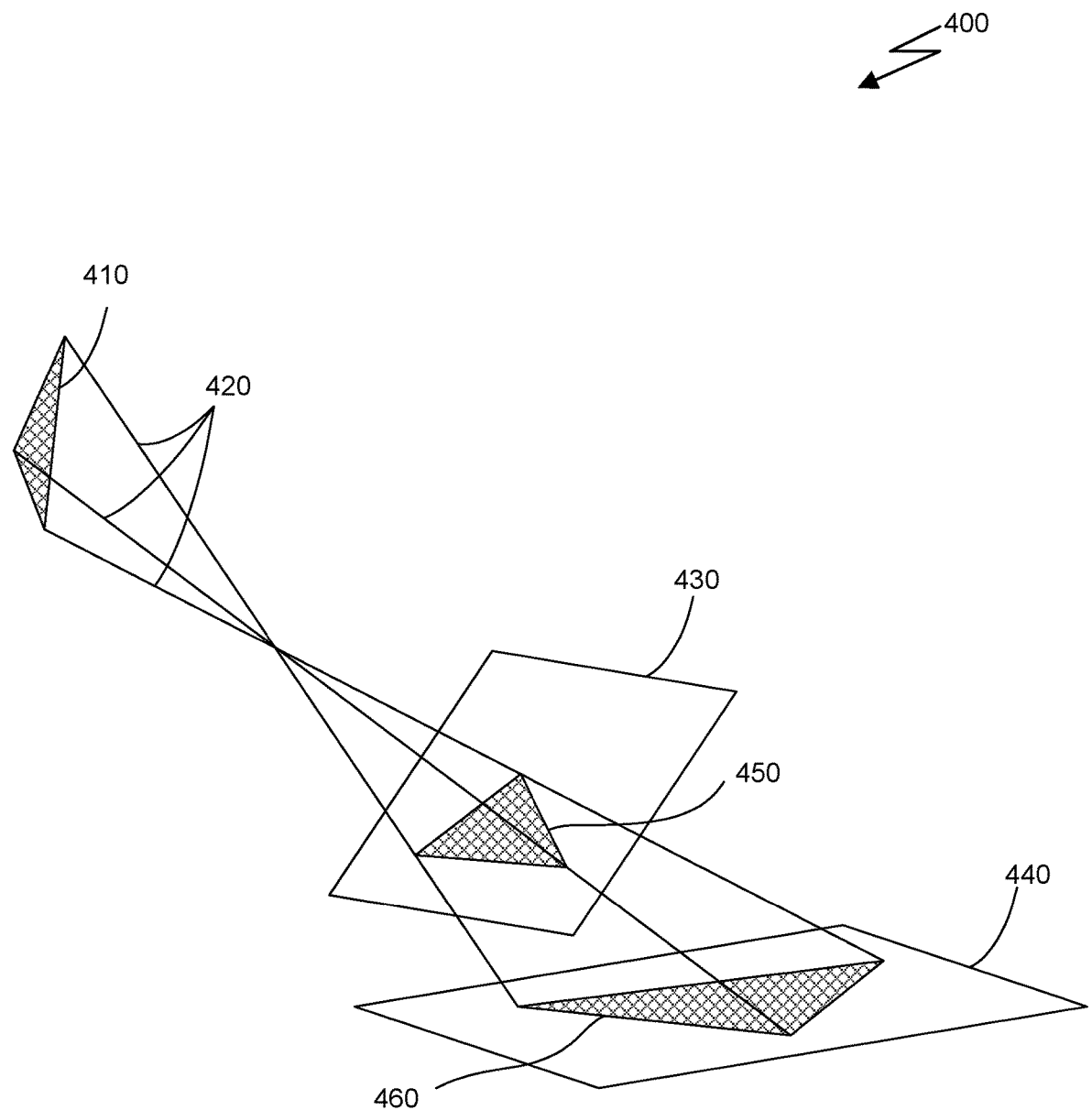
FIG. 4 demonstrates a projection of an object to two image planes in accordance with one or more examples.

FIG. 4 demonstrates a projection 400 of an object to two image planes according to one or more examples of the present disclosure.

An object 410 is captured by two images, which are associated with two different image planes 430 and 440. On the image plane 430, the image of the object 410 is an image 450. On the image plane 440, the image of the object 410 is an image 460. The images 450 and 460 may be determined by tracing rays 420 that propagate from the physical points on the surface of the object 410 to the respective image planes. Each of the pixels included in an image, such as the image 450 or 460, uniquely corresponds to a physical point of the object 410. Therefore, each pixel included in the image 450 on the image plane 430 uniquely corresponds to a pixel included in the image 460 on the image plane 440. A relationship between the image plane 430 and the image plane 440 may be determined based on the pixels of the image 450 and the corresponding pixels of the image 460 that are related to the same physical points of the object 410. The relationship may be represented by a matrix, which describes a genetic transformation function used to project pixels in one of the corresponding image planes to the other.

Figure 5A:
FIG. 5A is an exemplary image of a scene in accordance with one or more examples.
Figure 5B:
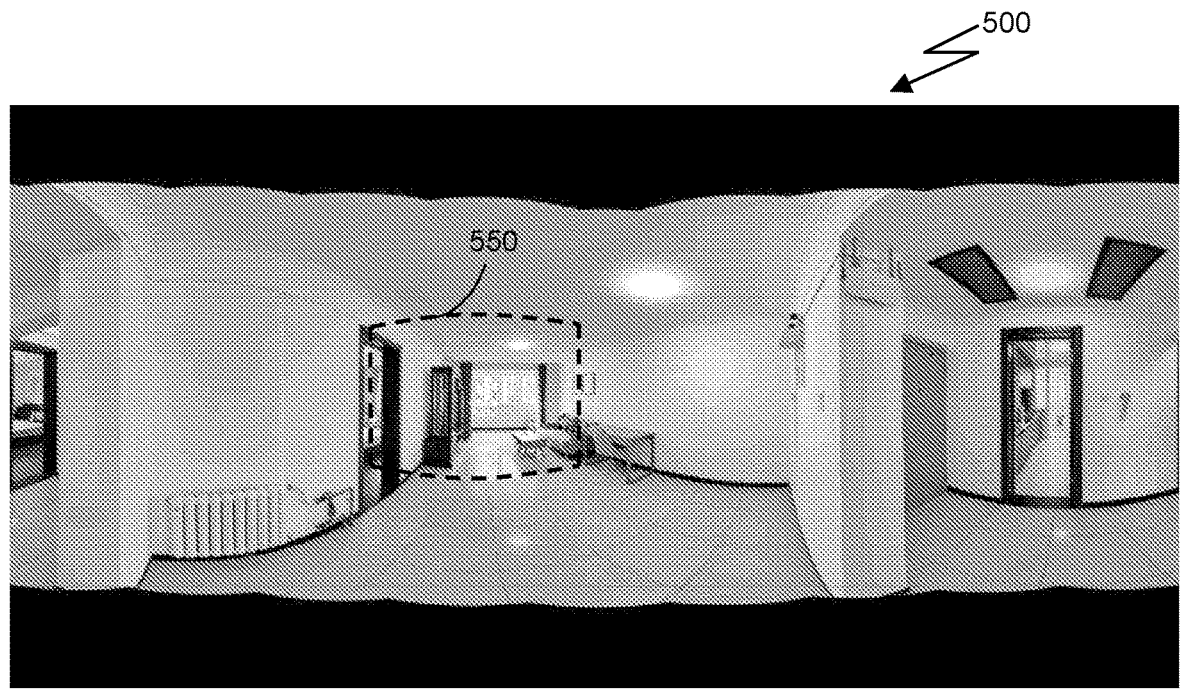
FIG. 5B illustrates an exemplary target scene included in the scene captured by the image as shown in FIG. 5A in accordance with one or more examples.

FIG. 5A is an exemplary image 500 of a scene and FIG. 5B illustrates an exemplary target scene 550 included in the scene captured by the image 500, according to one or more examples of the present disclosure. The image 500 is generated by stitching together a plurality of images along a horizontal direction, where the plurality of images may be acquired by an imaging device with a wide-angle lens. A target scene related to a frame in the recorded video may be represented as an area 550 in the image 500, according to the transformation between the image planes associated with the image 500 and the frame. In other words, the pixels of the area 550 in the image 500 correspond to the pixels of the respective frame included in the recorded video.

In some examples, the imaging device records motions of one or more objects in the target scene for the video. The one or more objects may or may not be captured by the image 500 of the scene. The computer system 200 may determine the area 550 in the image 500, which is associated with the target scene, based on identical contents in both the image 500 of the scene and the respective frame included in the recorded video.

Referring back to FIG. 3, at block 330, the computer system 200 selects one or more frames included in the recorded video. The video includes a plurality of frames. When the video is recorded with the same settings, including the position/pose of the imaging device and the internal parameters of the imaging device, the area in the image of the scene (e.g., the area 550 as shown in FIG. 5B), which is associated with the target scene, remains the same. The computer system 200 may select one or more frames included in the recorded video to determine the transformation between the image planes associated with the image of the scene (e.g., the image 500 as shown in FIG. 5A) and the frames included in the recorded video. In some variations, the computer system 200 may determine the transformation based on multiple frames selected from the video and utilizing optimization algorithms (e.g., statistical approximations) to improve the precision of the determined transformation.

In some examples, the settings of the imaging device (e.g., pan/tilt/zoom of the imaging device) may be changed during the video recording, causing the target scene to vary, thus resulting in different areas in the image of the scene, which are associated with the frames in the video. The computer system 200 may determine the different areas in the image of the scene in response to the changes of the target scene through the multiple frames selected from the video.

The computer system 200 may select the one or more frames from the recorded video based on various conditions/ algorithms. In some instances, the computer system 200 may select the first frame, the last frame, and/or any frame in between with a predefined frame number from the video. In some variations, the computer system 200 may select the one or more frames based on the changes of the settings of the imaging device. For instance, the computer system 200 may divide the obtained source video data into segmentations, each segmentation includes frames associated with the same settings (e.g., the field of view, the focal length, and/or the shooting angle) of the imaging device. Then, the computer system 200 may select the first and the last frames from each segmentation. In some examples, the computer system 200 may select the one or more frames based on motion analysis. For example, the computer system 200 may analyze the optical flow of the objects recorded in the video. Optical flow is defined as the apparent motion of individual pixels on the image plane, which can be used to estimate motions of the captured objects. The computer system 200 may select the one or more frames as the frame(s) having the least amount of optical flow. In some instances, the computer system 200 may select the one or more frames based on video clustering techniques. Clustering techniques can be used to identify groups of similar objects among multiple images. For instance, the computer system 200 may select a cluster center (e.g., a reference image including certain objects). Then, the computer system 200 may compare the frames of the video to the cluster center. Based on the comparison results, the computer system 200 may determine whether the frames belong to the same cluster as the existing cluster center or belong to a different cluster. In this way, the computer system 200 determines one or more clusters, each including a number of frames of the recorded video. Subsequently, the computer system 200 may select from each cluster a frame that is the most similar to the respective cluster center. However, it will be appreciated that methods for selecting one or more frames from a recorded video are not limited in the present disclosure.

At block 340, the computer system 200 determines matched features between the selected one or more frames and the image of the scene. The computer system 200 extracts a set of features from the image of the scene (e.g., the image 500 as shown in FIG. 5A) under predefined criterion for feature detection. Under the same criterion, the computer system 200 extracts a set of features from a selected frame included in the recorded video.

A feature (or a feature point) is defined as a part of an image (e.g., including a number of pixels) that contains a piece of information about the content of the image. Types of features include, but are not limited to, edges (e.g., boundaries between two image regions), corners (e.g., intersects between edges), blobs (e.g., local maxima or centers of gravity), ridges (e.g., curves whose points are local maxima), and/or other types of feature points. A feature can be uniquely represented by coordinates and feature descriptors. The coordinates may be described in pixels in an image plane. Feature descriptors are utilized to describe characteristics such as the shape, the color, the texture or the motion, among others. Feature descriptors represent a measure of certainty or confidence related to the statement about a feature value, which is defined based on the type of a feature. There are different types of descriptors used for feature detection. Algorithms used to obtain feature descriptors include Harris corner, Scale Invariant Feature Transform (SIFT), Speeded Up Robust Feature (SURF), Features from Accelerated Segment Test (FAST), Oriented FAST and Rotated BRIEF (ORB, where BRIEF is short for Binary Robust Independent Elementary Features), and/or other feature detection algorithms. As an example, descriptors for features may be obtained by applying local neighborhood operations. For instance, a descriptor for a feature may be determined based on calculations of different but neighboring points adjacent to the feature. In some variations, feature descriptors may be represented by a feature vector, which includes an n-dimensional vector of numerical features and n is an integer.

In some examples, the computer system 200 determines, based on the feature descriptors and/or the coordinates, multiple pairs of matched features. A pair of matched features includes a feature extracted from the image of the scene and a feature extracted from the frame included in the recorded video, and the pair of features are related to the same physical point(s) in the scene and thus are defined as matched features.

In some instances, the computer system 200 further determines a relationship between images planes associated with the image of the scene and the selected frame included in the recorded video based on the matched features. The relationship may be represented by a 3×3 matrix, which describes a relative rotation, translation and other plane parameters between the image planes associated with the image of the scene and the selected frame included in the recorded video.

At block 350, the computer system 200 generates, based on the matched features, a plurality of composite frames by combining the frames included in the video and the image of the scene. In some instances, the computer system 200 generates the composite frames based on the 3×3 matrix that is determined based on the matched features. The 3×3 matrix describes a generic relationship (e.g., rotation, translation, scale, and other parameters) for pixels between two image planes (e.g., associated with the image of the scene and associated with a selected frame included in the recorded video). The relationship describes a one-to-one correspondence between the pixels in the selected frame and the ones in the image of the scene. The pixels in the image of the scene, which are beyond the area associated with the target scene, can be projected to the image plane associated with the selected frame based on the determined relationship (e.g., the determined matrix) related to the selected frame.

In some variations, the settings of the imaging device remain the same when the imaging device records the video, such that the target scene remains the same for all the frames included in the recorded video. Therefore, the relationship between the image planes associated with the image of the scene and the selected frame(s) included in the recorded video can be applied to all the frames in the recorded video. The computer system 200 may project the pixels in the image plane associated with the image of the scene to the image plane associated with the frames in the recorded video based on the determined relationship. The computer system 200 further combines the projected pixels with the pixels in each frame to generate a composite frame for the respective frame. When the projected pixels fall in the target scene that is in the image plane associated with the frames, the computer system 200 uses the pixels of the frames for generation of the composite frames. When the projected pixels are outside the target scene that is in the image plane associated with the frames, the computer system 200 uses the projected pixels from the image of the scene for generation of the composite frames.

In some examples, the settings of the imaging device are changed when the imaging device records the video. Accordingly, at block 330, the computer system 200 selects multiple frames from the recorded video, so that the computer system 200 can determine the target scenes related to the different settings of the imaging device. The computer system 200 may further group the frames included in the recorded video based on the settings of the imaging device. Then, the computer system 200 may determine a relationship between the image plane associated with the image of the scene and the image plane associated with a group of frames for a set of settings of the imaging device. Similar to the aforementioned process, the computer system 200 projects the pixels in the image of the scene to the image plane associated with a frame based on a determined relationship corresponding to the frame. Then, the computer system 200 combines the projected pixels outside the target scene with the pixels of the frame that are inside the target scene, so as to generate a composite frame. In this way, the computer system 200 generates a plurality of composite frames corresponding to the plurality of frames included in the recorded video.

In some instances, the computer system 200 generates the composite frames in the plane associated with the image of the scene. Similar to the above-mentioned process, the computer system 200 first projects pixels in one frame to the image plane associated with the image of the scene. Then, the computer system 200 combines the projected pixels with the pixels in the image of the scene to generate a composite frame. Contrary to the aforementioned process, the computer system 200 ignores the pixels of the image of the scene, which are in the area (e.g., the area 550 as shown in FIG. 5B) related to the target scene. Instead, the computer system 200 uses the projected pixels for the area related to the target scene and the remainder pixels in the image of the scene in order to generate the composite frame.

Figure 6A:
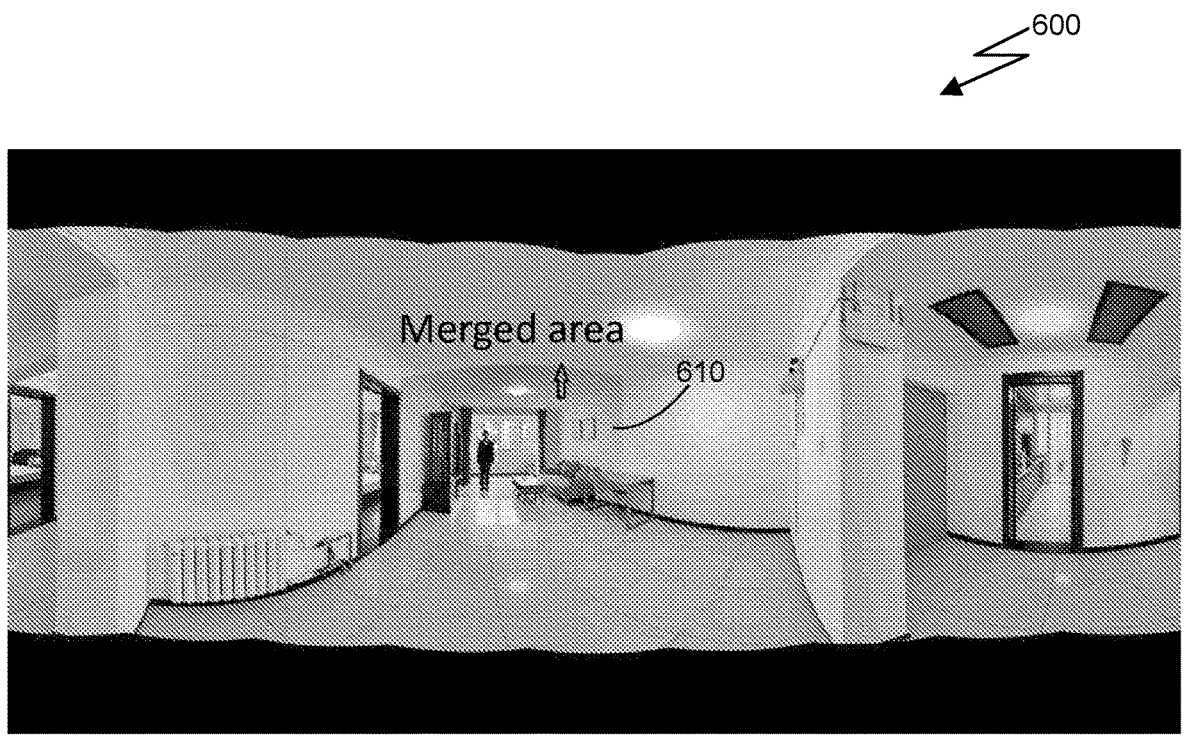
FIG. 6A depicts an exemplary composite frame in accordance with one or more examples.

FIG. 6A depicts an exemplary composite frame 600 according to one or more examples of the present disclosure. The composite frame 600 is generated based on the image 500 of the scene as shown in FIG. 5A. The image plane associated with the composite frame 600 may be the same as the one associated with the corresponding frame in the recorded video or the one associated with the image 500 of the scene. A merged area 610 in the composite frame 600 is surround by boundaries caused by combining the image 500 and the frame. The pixels included in the area 610 is selected by the computer system 200 from the frame included in the video for generation of the composite frame 600. The area 610 may be related to the field of view for recording the video. In some variations, the area 610 is a projected area of the target scene from the image plane associated with the frame to the image plane associated with the image 500 of the scene. Comparing to the image 500 as shown in FIG. 5A, the area 610 of the composite frame 600 includes additional objects (e.g., a person), which are recorded in the video but are not captured by the image 500 of the scene. The pixels of the composite frame 600 in the area 610 may be the pixels of a corresponding frame included in the video or the projected pixels from the corresponding frame. Since the light and shade of the frame is different from that of the image 500 of the scene, the composite frame 600 appears to have boundaries surrounding the merged area 610.

Figure 6B:
FIG. 6B depicts an exemplary composite frame that is the result of processing the composite frame as shown in FIG. 6A in accordance with one or more examples.

In some instances, the computer system further processes the composite frames (e.g., the composite frame 600) to improve the quality of the composite frames. FIG. 6B depicts an exemplary composite frame 650 that is the result of processing the composite frame 600 as shown in FIG. 6A according to one or more examples of the present disclosure.

In some variations, the computer system 200 processes the composite frame 600 to mitigate the boundaries of the merged area 610. For instance, the computer system 200 may utilize feathering techniques to smooth or blur the boundaries of the area 610, which can be used to blend the edges of a selected feature into the background of the image.

In some examples, the computer system 200 performs color adjustment (e.g., brightness, contrast) to the composite frame 600. The computer system 200 may perform the color adjustment based on color differences between the pixels in the frame included in the recorded video and the corresponding pixels in the image 500 of the scene. The computer system 200 may further determine a color mapping function and/or color lookup table based on the color differences between pixels in the frame and corresponding pixels in the image 500 of the scene. The following two examples assume that a composite frame is generated by combining the pixels projected from a corresponding frame in the recorded video and the pixels of the image 500 of the scene for ease of describing the techniques disclosed in the present disclosure. However, it will be appreciated that the techniques disclosed herein can be applied to composite frames generated by other processes described in the present disclosure.

As an example, the computer system 200 determines a color mapping function, which causes minimized color differences between the pixels projected from a frame and the corresponding pixels in the image 500 of the scene. The color mapping function may be initialized by the second-order Taylor series expansion of the exponential function. When the color differences are small, the higher order components in the Taylor series vanishes quickly, thus the second-order Taylor series expansion provides decent approximation. The computer system 200 calculates the coefficients in the color mapping function based on the color values of the projected pixels from the frame and the color values of the corresponding pixels in the image 500 of the scene. In this way, the computer system 200 determines the color mapping function for the respective composite frame. By repeating the aforementioned processes, the computer system 200 determines color mapping functions for all the frames included in the recorded video. Based on the determined color mapping functions, the computer system 200 adjusts colors in the composite frames. For instance, the computer system 200 may change the color value of the projected pixels from the frames in the recorded video so as to align the color of these pixels to the pixels in the image 500 of the scene. Alternatively, the computer system 200 may change the color values of the pixels related to the image 500 of the scene so as to align the color of these pixels with the projected pixels from the frames in the recorded video.

In another example, the computer system 200 determines a color lookup table, which causes minimized color differences between the projected pixels in a frame and the corresponding pixels in the image 500 of the scene. For the color lookup table related to a composite frame, the computer system 200 first determines a group of pixels that are among the projected pixels from a respective frame included in the recorded video. The group of pixels have different color values with a preset range. Take the grayscale color value as an example, the grayscale color values of the group of the pixels may range from 0 to 255. Then, the computer system 200 determines a group of corresponding pixels in the image 500 of the scene, where each projected pixel from the frame uniquely corresponds to a pixel in the image 500 of the scene, for example, based on the aforementioned matrix. The computer system 200 includes the color values of the group of projected pixels and the color values of the corresponding pixels in the image 500 of the scene and indicates one-to-one correspondences between the pair of corresponding pixels in the color lookup table. When there are missing data (e.g., missing pixels/color values), the missing data can be constructed by applying interpolation. The computer system 200 adjusts the composite frame based on the corresponding color lookup table. For example, the computer system 200 may change the color values of the projected pixels from the frames in the recorded video so as to align the color of these pixels to the pixels in the image 500 of the scene. Alternatively, the computer system 200 may change the color values of the pixels related to the image 500 of the scene so as to align the color of these pixels with the projected pixels from the frames in the recorded video. Similarly, the computer system 200 determines color lookup tables for all the composite frames and performs color adjustment to all the composite frames based on the corresponding color lookup tables.

As shown in FIG. 6B, the quality of the composite frame 650 is improved after processing of the composite frame 600 as shown in FIG. 6A.

Referring back to FIG. 3, at block 360, the computer system 200 generates a composite video based on the plurality of composite frames. The computer system 200 combines the plurality of composite frames to generate the composite video. In some examples, the generated composite video may be a panoramic video of the scene, which has an enlarged field of view than the video acquired for the target scene. The computer system 200 may further cause display of the composite video on the display 240 of the computer system 200 or on an external display that is connected to the computer system 200 through the communication interface 220.

Figure 7:
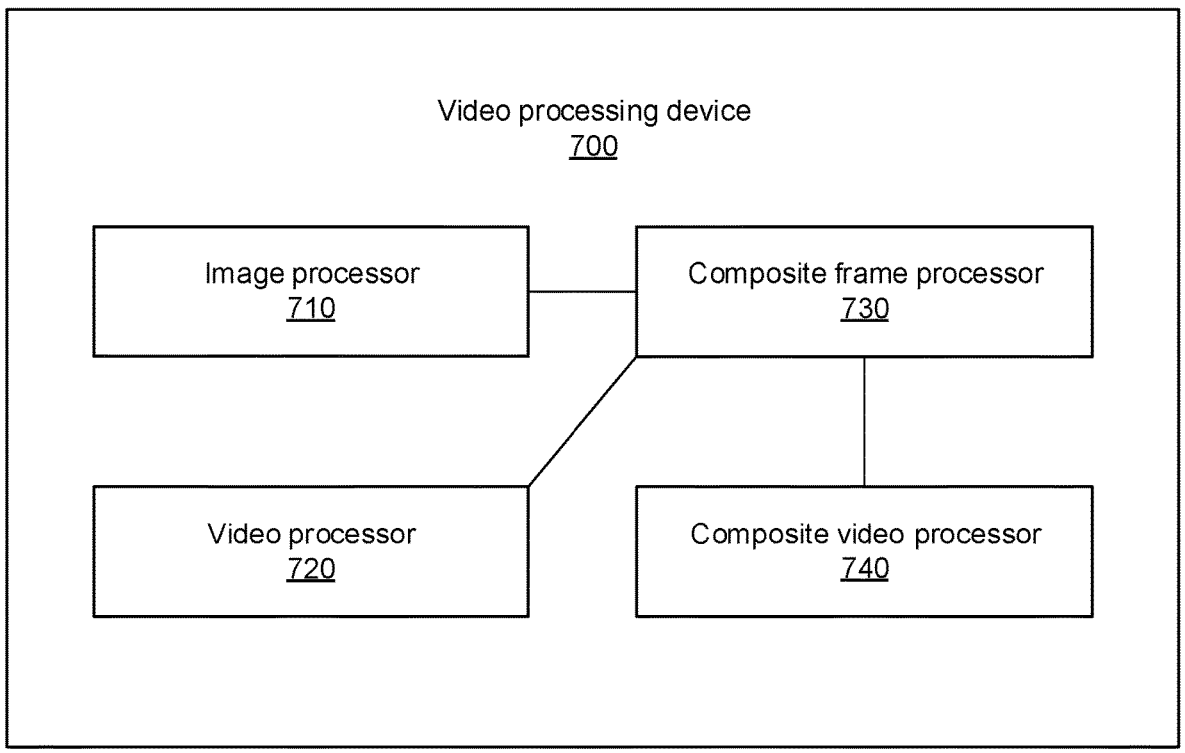
FIG. 7 is an exemplary video processing device in accordance with one or more examples.

The foregoing disclosed processes may be carried on by an exemplary video processing device 700 as illustrated in FIG. 7 according to one or more examples of the present disclosure. The video processing device 700 may comprise multiple processors such as an image processor 710, a video processor 720, a composite frame processor 730 and a composite video processor 740. In some instances, the video processing device 700 may include one or more imaging modules for acquiring multiple images of a scene and/or a video recorded for an area of the scene. The area of the scene that is recorded in the video may be defined as a target scene. In some variations, the video processing device may further include a display that can be used for displaying images/videos processed by the video processing device 700.

The image processor 710 is configured to obtain an image of a scene comprising a target scene. The image processor 710 performs the processes described in block 310 of the process 300 as shown in FIG. 3 so as to obtain the image of the scene.

The video processor 720 is configured to obtain a video recorded for the target scene and select one or more frames included in the recorded video. The video may capture motions of one or more objects in the target scene. The image processor 720 performs the processes described in block 320 of the process 300 as shown in FIG. 3 so as to obtain the recorded video for the target scene. The video processor 720 further performs the processes described in block 330 of the process 300 as shown in FIG. 3 so as to select one or more frames included in the recorded video.

The composite frame processor 730 receives data from the image processor 710 and the video processor 720. For example, the data may include a panoramic image of the scene, the selected one or more frames from the recorded video, and other data that are processed by the image processor 710 and the video processor 720. The composite frame processor 730 is configured to determine matched features between the selected one or more frames and the image of the scene, and generate a plurality of composite frames based on the matched features. The composite frame processor 730 performs the processes described in block 340 of the process 300 as shown in FIG. 3 so as to determine a plurality of matched features based on identical features in both the image of the scene and the selected one or more frames from the recorded video. The composite frame processor 730 further performs the processes described in block 350 of the process 300 as shown in FIG. 3 so as to generate a plurality of composite frames based on the matched features. In some examples, the composite frame processor 730 processes the generated composite frames, such as mitigating boundaries surrounding merged areas (e.g., the area 610 as shown in FIG. 6A) and/or adjusting colors in the composite frames.

The composite video processor 740 receives the plurality of composite frames from the composite frame processor 730 and is configured to generate a composite video based on the plurality of composite frames. The composite video processor 730 performs the processes described in block 360 of the process 300 as shown in FIG. 3 so as to generate a composite video by combining the plurality of composite frames. The composite video processor 740 may further cause display of the generated composite video on the video processing device 700 or transfer the graphic data of the composite video to a device connected to the video processing device 700 for display of the composite video.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

What is claimed is:

1. A method for video processing, comprising:
   obtaining an image of a scene;
   obtaining a video that records an area included in the scene, the video comprising a plurality of frames, wherein the image of the scene is associated with a first image plane, and each frame in the video is associated with a second image plane;
   determining one or more frames from the plurality of frames of the video;
   determining pairs of matched features, wherein each of the pairs of matched features is related to an object that is in both the image and the one or more frames, and wherein each of the pairs of matched features is associated with one or more pixels of the image of the scene and one or more pixels of a selected frame of the one or more frames;
   determining, based on the matched features, one or more relationships between the first image plane and one or more second image planes;
   generating, based on the pairs of matched features, a plurality of composite frames by combining each of the selected one or more frames with the image of the scene, wherein generating the plurality of composite frames further comprises:
      projecting, based on the one or more relationships, pixels of the frames in the video from the associated second image planes to the first image plane; and
      combining the projected pixels with the pixels of the image of the scene in the first image plane to generate the plurality of composite frames; and
   generating a composite video based on the plurality of composite frames.

2. The method according to claim 1, wherein the area recorded by the video is a target scene included in the scene, wherein pixels in the composite frames that are related to the target scene are the projected pixels from the respective second image planes, and wherein the remainder pixels in the composite frames are from the pixels in the image of the scene.

3. The method according to claim 1, wherein the second image planes for the frames in the video are the same, and one relationship is determined between the first image plane and the second image planes based on the one or more frames.

4. The method according to claim 1, wherein the second image planes for the frames in the video include different second image planes, wherein the frames in the video are divided into groups, and each group of the frames is associated with one second image plane, and wherein one relationship is determined for each group of the frames.

5. The method according to claim 4, wherein processing the plurality of composite frames further comprises:
   mitigating boundaries caused by combining each of the one or more frames with the image of the scene; or
   adjusting colors in the composite frames.

6. The method according to claim 5, further comprising:
   processing the plurality of composite frames to improve the quality of the composite frames,
   wherein the composite video is generated based on the processed composite frames.

7. The method according to claim 1, wherein determining the matched features between the image of the scene and the one or more frames further comprises:
   determining a set of first features from the image of the scene;
   determining a set of second features from each of the one or more frames; and
   comparing the set of first features and each set of second features,
   wherein the matched features include the first features and the corresponding second features that are related to the same objects in the scene based on the comparison results.

8. The method according to claim 1, wherein obtaining the image of the scene further comprises:
   obtaining a plurality of images from different perspectives; and
   generating the image of the scene by combining the plurality of images.

9. The method according to claim 1, wherein the video is recorded by an imaging device, and the settings of the imaging device remain the same during the recording of the video.

10. The method according to claim 1, wherein the video is recorded for motions of one or more objects in the area included in the scene.

11. The method according to claim 1, further comprising:
    causing display of the composite video.

12. A device for video processing, comprising:
one or more processors; and
a non-transitory computer-readable medium, having computer-executable instructions stored thereon, the computer-executable instructions, when executed by the one or more processors, causing the one or more processors to facilitate:
obtaining an image of a scene;
obtaining a video that records an area included in the scene, the video comprising a plurality of frames, wherein the image of the scene is associated with a first image plane, and each frame in the video is associated with a second image plane;
determining one or more frames from the plurality of frames of the video;
determining pairs of matched features, wherein each of the pairs of matched features is related to an object that is in both the image and the one or more frames, and wherein each of the pairs of matched features is associated with one or more pixels of the image of the scene and one or more pixels of a selected frame of the one or more frames;
determining, based on the matched features, one or more relationships between the first image plane and one or more second image planes;
generating, based on the pairs of matched features, a plurality of composite frames by combining each of the selected one or more frames with the image of the scene, wherein generating the plurality of composite frames further comprises:
projecting, based on the one or more relationships, pixels of the frames in the video from the associated second image planes to the first image plane; and
combining the projected pixels with the pixels of the image of the scene in the first image plane to generate the plurality of composite frames; and
generating a composite video based on the plurality of composite frames.

13. The device according to claim 12, wherein the area recorded by the video is a target scene included in the scene, wherein pixels in the composite frames that are related to the target scene are the projected pixels from the respective second image planes, and wherein the remainder pixels in the composite frames are from the pixels in the image of the scene.

14. The device according to claim 12, wherein the second image planes for the frames in the video are the same, and one relationship is determined between the first image plane and the second image planes based on the one or more frames.

15. The device according to claim 12, wherein the second image planes for the frames in the video include different second image planes, wherein the frames in the video are divided into groups, and each group of the frames is associated with one second image plane, and wherein one relationship is determined for each group of the frames.

16. The device according to claim 12, wherein the instructions cause the one or more processors to further facilitate:
processing the plurality of composite frames to improve the quality of the composite frames,
wherein the composite video is generated based on the processed composite frames.

17. The device according to claim 16, wherein processing the plurality of composite frames further comprises:
mitigating boundaries caused by combining each of the one or more frames with the image of the scene; or
adjusting colors in the composite frames.

18. A non-transitory computer-readable medium, having computer-executable instructions stored thereon, the computer-executable instructions, when executed by one or more processors, causing a processor to facilitate:
obtaining an image of a scene;
obtaining a video that records an area included in the scene, the video comprising a plurality of frames, wherein the image of the scene is associated with a first image plane, and each frame in the video is associated with a second image plane;
determining one or more frames from the plurality of frames of the video;
determining pairs of matched features, wherein each of the pairs of matched features is related to an object that is in both the image and the one or more frames, and wherein each of the pairs of matched features is associated with one or more pixels of the image of the scene and one or more pixels of a selected frame of the one or more frames;
determining, based on the matched features, one or more relationships between the first image plane and one or more second image planes;
generating, based on the pairs of matched features, a plurality of composite frames by combining each of the selected one or more frames with the image of the scene, wherein generating the plurality of composite frames further comprises:
projecting, based on the one or more relationships, pixels of the frames in the video from the associated second image planes to the first image plane; and
combining the projected pixels with the pixels of the image of the scene in the first image plane to generate the plurality of composite frames; and
generating a composite video based on the plurality of composite frames.

19. The non-transitory computer-readable medium according to claim 18, wherein the area recorded by the video is a target scene included in the scene, wherein pixels in the composite frames that are related to the target scene are the projected pixels from the respective second image planes, and wherein the remainder pixels in the composite frames are from the pixels in the image of the scene.

20. The non-transitory computer-readable medium according to claim 18, wherein the second image planes for the frames in the video are the same, and one relationship is determined between the first image plane and the second image planes based on the one or more frames.

* * * * *